United States Patent
Ament (10) Patent No.: US 7,328,291 B2
(45) Date of Patent: Feb. 5, 2008

(54) SYSTEM AND METHOD FOR CONTROLLING THE SERVICE ENGAGEMENT IN A DATA BUS SYSTEM

(75) Inventor: Peter Ament, Esslingen (DE)

(73) Assignee: DaimlerChrysler AG, Stuttgart (DE)

( * ) Notice: Subject to any disclaimer, the term of this patent is extended or adjusted under 35 U.S.C. 154(b) by 806 days.

(21) Appl. No.: 10/651,244

(22) Filed: Aug. 29, 2003

(65) Prior Publication Data

US 2004/0105436 A1    Jun. 3, 2004

(30) Foreign Application Priority Data

Aug. 30, 2002   (DE) ............................... 102 39 934

(51) Int. Cl.
  G06F 13/00   (2006.01)
  G06F 13/36   (2006.01)
  G06F 13/362  (2006.01)
  G06F 12/00   (2006.01)
  G06F 13/14   (2006.01)
  G06F 13/38   (2006.01)
  H04L 12/50   (2006.01)

(52) U.S. Cl. ...................... 710/107; 710/114; 710/241; 710/244; 370/362

(58) Field of Classification Search ........ 710/240–244, 710/107, 114; 370/362
See application file for complete search history.

(56) References Cited

U.S. PATENT DOCUMENTS

| | | | |
|---|---|---|---|
| 5,930,486 A * | 7/1999 | Looi et al. ................... | 711/113 |
| 6,035,361 A * | 3/2000 | Kim et al. ................... | 710/113 |
| 6,332,023 B1 * | 12/2001 | Porter et al. ................ | 379/242 |
| 6,363,434 B1 * | 3/2002 | Eytchison ................... | 719/313 |
| 6,651,125 B2 * | 11/2003 | Maergner et al. ........... | 710/244 |
| 6,675,246 B1 * | 1/2004 | Molnar et al. .............. | 710/240 |

(Continued)

FOREIGN PATENT DOCUMENTS

DE   10023705   11/2001

(Continued)

OTHER PUBLICATIONS

Goscinski et al., "Resource management in large distributed systems", Oct. 1990, ACM Press, vol. 24, Issue 4, pp. 7-25.*

(Continued)

Primary Examiner—Mark H. Rinehart
Assistant Examiner—Faisal Zaman
(74) Attorney, Agent, or Firm—Crowell & Moring LLP (57) ABSTRACT

Data bus system and method are provided for controlling service engagements for bus users. At least one bus user provides services and other bus users use these services. A resource manager stores information about the available services and information about the service-providing bus users. The resource manager reserves a service from a providing bus user if the service can be used, and sends a response to a requesting bus user, allowing the requesting bus user to use the service from the providing bus user via the data bus. Information about the provided services is provided on the data bus via a standard interface by the bus users and a change in the provision of a service by a bus user is made available to the resource manager via the standard interface. The resource manager controls the service engagement on the basis of a priority information item.

28 Claims, 4 Drawing Sheets

U.S. PATENT DOCUMENTS

2002/0083245 A1* 6/2002 Van De Meulenhof et al. .. 710/107

FOREIGN PATENT DOCUMENTS

EP 0 771 098 A2 5/1997

OTHER PUBLICATIONS

Kimovski et al., "Resource Manager for distance education systems", Aug. 2001, IEEE, IEEE International Conference on Advanced Learning Technologies, 2001 Proceedings, pp. 387-390.*

Search Report, Oct. 20, 2005.

* cited by examiner

FIG.5

SYSTEM AND METHOD FOR CONTROLLING THE SERVICE ENGAGEMENT IN A DATA BUS SYSTEM

BACKGROUND AND SUMMARY OF THE INVENTION

This application claims the priority of German Patent Document 102 39 934.4, filed in Germany on Aug. 30, 2002, the disclosure of which is expressly incorporated by reference herein.

The invention relates generally to a method for controlling service engagements for the bus users in a data bus system having a resource manager and bus users using the data bus. At least one bus user provides services and other bus users use these services. The resource manager stores information about the type of the available services provided by the bus users and information about the service-providing bus users. The resource manager reserves a service from a providing bus user if the service is free and sends a response to a requesting bus user so that the requesting bus user can use the service from the providing bus user via the data bus.

Particularly in connection with telematics systems, resource managers are used in order to control a large number of services and large volumes of data. By way of example, a service may be an application program, particularly a piece of software that can be executed on a control unit. The service is preferably used by other software programs or services. In complex telematics systems, application programs called in various telematics applications are not stored a plurality of times in various components but rather once as a service program. This service program is then called a plurality of times by different control units when various programs are executed. In complex telematics systems, particular services are required very frequently, which means that the resources, i.e. the services provided, are managed. This involves recording engagement times for the services and, in the event of a request by a service user, reserving a service and preparing it for service use.

Such resource management methods are used in connection with methods of transport, for example aircraft, motor vehicles and others, and are either stored centrally in a resource control unit or are provided distributed over a plurality of control units. In connection with motor vehicles, resources of the data bus itself, i.e. its engagement and free channels and resources of the telematics system are both managed, with the telematics system being connected to the data bus in distributed form. In this case, resources of navigation systems, radio receivers, television receivers and telephone-linked diagnostic and software systems are managed.

Such resource management methods are typically used in connection with telematics data buses. Alternatively, a resource management system can be used with conventional data buses, for example with a CAN or LIN data bus. To provide a better understanding of the rest of the description, a brief description of the MOST data bus used in motor vehicles is given as an example of a telematics data bus. Data transmission via the MOST data bus is divided into frames having a length of 64 bytes. Of these, the first and last bytes are used for administrative purposes at bus level. The remaining bytes are assigned to an area for synchronous channels, to an area for asynchronous data transmission and to a control channel with 2 bytes. The synchronous channels are used to transmit synchronous data, for example audio data and video data. The asynchronous area is used for packet-oriented data transmission. The control bytes of the control channel interact with other control bytes in the other frames. The control bytes are evaluated in order to interchange control messages between the devices on the MOST bus. The frames are message blocks recurring cyclically at a frame frequency. Synchronous and asynchronous areas can be used for the different resources according to requirements. By way of example, synchronous channels can also be clustered for television transmission.

On the basis of the MOST Specification Framework, section 6.0 "MOST Frame structure", synchronous data channels for connecting a source (e.g., CD player) and a sink (e.g., amplifier) are provided for as long as a synchronous channel is open. The synchronous and asynchronous channels are controlled using the control channel. A piece of software in one of the control units sends a control message to the devices which are involved, in order to connect the data source to the new data sink. The other MOST functions are also addressed using the control channel.

In the case of the MOST data bus and similar data bus systems, resource managers are used in order to manage all the resources of the data bus system itself, including management of the synchronous and asynchronous channels and their sides, and the resources of the functions provided via the data bus. The resource manager knows all the resources of the system that need to be managed. The resource manager is the central management unit for the resources of the data bus system. In addition, the resource manager monitors and observes current resource use and knows the services that are not currently being used. As soon as an application function calls one of the resources, for example services, functions or initialization parameters, from the resource manager, the resource manager enables the service if use of the service is possible or permitted. This involves taking into account priority levels and service accessibility, for example. If the calling function has low priority or if no provision is made for the service to be accessed, then the resource manager also rejects access.

It is an object of the present invention to specify a system and method for controlling the service engagement in a data bus system which controls the resources, the service engagement and/or the service allocation in complex data bus systems having synchronous and asynchronous functions.

In a first embodiment of the present invention, information about the provided services is provided on the data bus by the bus users via a standard interface. The change in the provision of a service from a bus user is made available to the resource manager via the standard interface. The resource manager controls the service engagement on the basis of a priority information item that is transmitted to the resource manager in a message (request or notification) from a requesting bus user, for example. The priority information item does not necessarily have to be transmitted with a resource request. Alternatively, an application can also send its resource request to the resource manager with an application identifier, and the resource manager can send a request to the priority manager, which knows the current overall system state and takes it as a basis for assigning a priority to the resource request using the application identifier. The priority manager then notifies the resource manager of the priority, and the resource manager engages the services on the basis of the priority information.

The standard interface allows data interchange between any desired functions which call a service and the resource manager. All resource requests are sent to the resource manager's interface. This can involve functions using the data bus to send a request to the resource manager's interface. Since all requests are sent to the resource manager's interface, the resource manager can easily record the use of the services and the engagement time. The resource manager can then take the current resource engagement or the current resource requests as a basis for deciding whether a particular function is granted or refused a service or whether the request is put into a queuing loop.

The resource manager preferably knows all of the resources that are available in the system. In order to have information about the resources of the resource manager, the startup of the data bus involves recording every function block which provides resources, and this involves compiling information regarding which resources can be provided by a function block. In addition, it is possible to establish which requests and/or which associated priority are provided for a function block.

Every resource or every service is made available to the system via a controlling function block in a standard manner. For synchronous resources, the interface preferably has special interface functions that are used in this connection.

The resource manager can control the engagement of the data channels within a frame, for example using the service "engagement of data channel n". By way of example, the resource manager can assign individual synchronous data channels within a frame to one or more bus users using them.

The service-providing bus users preferably have a standard interface that can be used to check the information relating to the services from the resource manager or from the rest of the bus users. The interface between the data bus and a service-providing bus user has data formats for information that indicates the number and type of the services. It is also possible to transmit the maximum number of service users per service at one time.

In a second embodiment of the present invention, information about the provided services is provided on the data bus by the bus users via a standard interface. A change in the provision of a service by a bus user is made available to the resource manager via the standard interface, so that the resource manager controls services that relate to functions of the bus users themselves.

In contrast to the first embodiment, this resource management method does not involve controlling the channels of the data bus and services linked thereto, but rather involves the control of services from individual bus users on the data bus. In particular, services of a distributed telematics system are controlled and, in so doing, particularly the services of the individual telematics components. This can also involve management of the association between a data sink and a data source in relation to a synchronous data bus channel.

Alternatively, the method in accordance with the first preferred embodiment (i.e., management of the data-bus-related resources) can be combined with the method in accordance with the second embodiment (i.e., management of the resources of the bus users in the telematics system).

By way of example, for the "amplifier engagement" function, a telephone and a radio can be connected simultaneously. In another embodiment of the present invention, the message transmission need for each individual bus user on the data bus can be requested or estimated.

Beyond the actual data bus management function, the resource manager preferably cooperates closely with services of the telematics system. Every piece of software that can be called in the telematics system, i.e., which can be called by other application functions, is stored in the resource manager, so that the resource manager has a list of all the services of the telematics system available. If a function accesses a service, the resource manager collects information about this service and establishes the service's storage location, for example on a first control unit at a particular storage location. The synchronous data bus resources are treated in a specific way. Since the data bus itself usually has functions available for stipulating or connecting synchronous data channels to synchronous resources, the resource manager often uses the functions already available in the data bus system.

The resource manager is informed about changes in the services by the service-providing bus users. Service-requesting bus users send their request to the resource manager. For each request, the bus users communicate the requested resources and possibly also the priority of the request. The resource manager decides about the allocation of the requested services on the basis of the availability and on the basis of the priority of the request.

A resource conflict arises when a requested resource has already been engaged. The resource conflict is resolved by the resource manager. If the priority of the current request is higher than the priority of the bus user which is already a user, the service's existing engagement is cancelled and the service can be engaged for the requesting bus user by the resource manager. If the priority of the current request is lower than or the same as the priority of the bus user which is already a user, the bus user's request is rejected by the resource manager or is entered into the list of already existing requests in order. A requesting bus user can indicate whether it needs to be put into a waiting list if the service is engaged.

Each resource is preferably provided on the resource manager's interface by the resource-providing function block in a standard manner. By way of example, existing interface functions can be used for synchronous resources of the data bus. For other resources, functions such as a resource counter, resource info, resource conflict, stipulate resources, remove resources, and resource use can be provided. The resource manager preferably has an error-handling algorithm that can also be used to take care of functions and service requests that have incorrectly not been transmitted to the resource manager's interface. One option for an error-handling routine involves the resource manager monitoring the use of all the resources and establishing whether a correct service request exists therefor. The resource manager can then immediately stop dubious resource engagements.

Provision can be made for the resource manager not to know the user of a service, for example the bus user making the resource request. This requirement allows flexible and expandable resource management. The resource manager produces an explicit designation on the basis of a resource request. This designation is used for explicitly linking a service to a requesting bus user. Normally, however, the resource manager has no direct association with the real bus user, which means that the resource manager's information cannot be used to infer real devices. This has the advantage that there is an increased data security level on the telematics system. This behavior has nothing to do with data security, but rather increases the system's openness and flexibility. The resource manager does not need to know applications using resources. For example they can be introduced into a system retrospectively.

An application program (application) which requests resources or services from the resource manager transfers with the request a list of the services or resources required and possibly a priority for each request. On the basis of the existing requests, the resource manager then enables the services for the requesting application programs on the basis of the associated priorities.

The resource manager can be in the form of a function block, for example. In connection with the MOST data bus system, the resource manager can be implemented as an "Fblock". A MOST FBlock can be implemented in every bus user on the MOST data bus. This results in a very high level of flexibility, and available tools for producing such FBlock functions of the MOST can be used. The resource manager can be programmable and can be moved flexibly from one bus user to the other.

A more complete understanding of the present invention will be afforded to those skilled in the art, as well as a realization of additional advantages and objects thereof, by a consideration of the following detailed description of the drawings. Reference will be made to the appended sheets of drawings, which will first be described briefly.

DETAILED DESCRIPTION OF THE DRAWINGS

Figure 1:
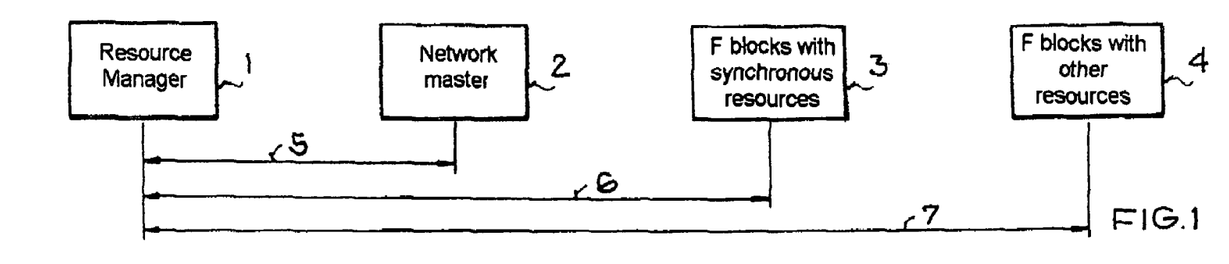
FIG. 1 shows an illustration of the startup behavior of the resource manager in accordance with a preferred embodiment.

FIG. 1 illustrates a preferred method for controlling service engagements for the bus users in a data bus system. Bus users are control units present on the data bus or programs that can be executed on these control units. They include the resource manager 1, the network master 2, a function block (FBlock) 3 with synchronous resources and a function block (FBlock) 4 with other resources. Each of the bus users 1-4 provides services for the data bus system or telematics system, and each individual bus user 1-4 can use services from the other bus users 1-4. The resource manager 1 stores information about the type of the services and information provided by the subscribers 1-4, and reserves a service from a providing bus user if the latter's service can be used. In addition, the resource manager 1 sends a response to a requesting bus user, so that the requesting bus user can use the service from the providing bus user via the data bus.

The preferred startup behavior of the telematics system with the data bus and the various bus users is illustrated in FIG. 1. The diagram shows the various communications steps between the resource manager 1 and the other bus users 2-4 at the startup time. When the resource manager 1 is supplied with power after the system has been turned on, the other systems and bus users are also supplied with power and the various variables in the software are initialized according to the presets. After the network master 2 transmits the message for initialization having been completed to the resource manager 1 via the data bus, the resource manager 1 starts communication. The resource manager 1 then checks all the resources which are available via the data bus and stores on itself various information relating to each resource in order to be able to carry out successful resource management for the entire telematics system. In this context, synchronous resources, i.e. resources with cyclically recurring transmission requirements, are treated differently from the other asynchronous resources. There is a division between synchronous and asynchronous services because transmission via the data bus takes place in different areas of the frames. By way of example, synchronous time slots and subsequent asynchronous areas are provided for a MOST data bus.

During the startup process for the telematics system, the necessary startup time is preferably kept as short as possible. By way of example, certain checks by the resource manager can also be performed simultaneously or immediately after one another. If the startup process is still not complete while bus users 1-4 are already making service requests to the resource manager, these service requests are buffer-stored on the resource manager 1 so that such service requests can be taken care of immediately after the startup phase. The startup process proceeds as described below.

After the resource manager 1 has been initialized in terms of variables and objects, it awaits a status message from the network master 2 during a communication 5. The network master 2 sends this message 5 to the resource manager 1 via the data bus. If the network master 2 is in the form of a control unit and the resource manager 1 exists as executable software thereon, the communication 5 can also be transmitted as a message between two software modules. Following receipt of the message during the communication 5, the resource manager 1 sends a message to the network master 2 in order to be able to take care of the central register in the network master 2. The network master 2 then transmits a copy of the central register to the resource manager 1. The central register stores information relating to the rest of the bus users 1-4 and the requesting functions (FBlock) and relating to the usable services. In the event of a change in the telematics system or in the data bus system, network master 2 transmits a change message to the resource manager 1, so that the latter is informed about function changes or service changes in the system.

During the communication 5, the network master 2 also transmits information about the time sequence of the data transmission via the data bus. This "boundary information" indicates, by way of example, which temporal relationships are used to transmit synchronous and asynchronous areas or which memory areas of the network master 2 are used to store the data from the resource manager 1.

During the communication 6, the resource manager 1 checks all the function blocks 3 with synchronous resources. The communication 6 allows the resource manager 1 to compile all the information about synchronous resources within the system. First, the resource manager 1 checks the number of synchronous sources and sinks for these function blocks. By way of example, a synchronous source is a function that transmits cyclically recurring signals from a sensor within the data bus system, and a synchronous sink is the receiver of this cyclic signal. When the communication 6 has ended, the resource manager 1 knows all the synchronous resources in the system and has stored the information relating to these resources. Other bus users 1-4 can use special commands and functions to check information relating to these synchronous resources. Such functions include SourceInfo, SinkInfo and SyncDataInfo, for example. Finally, the relationships between the individual function blocks will be described, and each sink can be assigned a corresponding source function block.

During the communication 7, the resource manager 1 checks the function blocks 4 with the rest of the resources. To this end, the resource manager 1 has a set of functions for the purpose of obtaining the status of the resources and particular information and identifiers for the services and for the checking functions. The resource manager 1 also has function checks for the purpose of identifying the conflict between a plurality of checking functions in advance. This can be the case, by way of example, when two function blocks need to access a service at the same time. The resource manager 1 then sets up particular rules for these function blocks 4, so that resource conflicts can be avoided.

At the end of the startup sequence, the resource manager 1 is informed about all of the functions 3, 4 and all of the services available in the system and has stored the necessary information relating thereto. The resource manager 1 will request resources on the basis of the information which is now available, will receive information from the bus users 3, 4 with the various function blocks, and will control access to the services available in the system.

Figure 2:
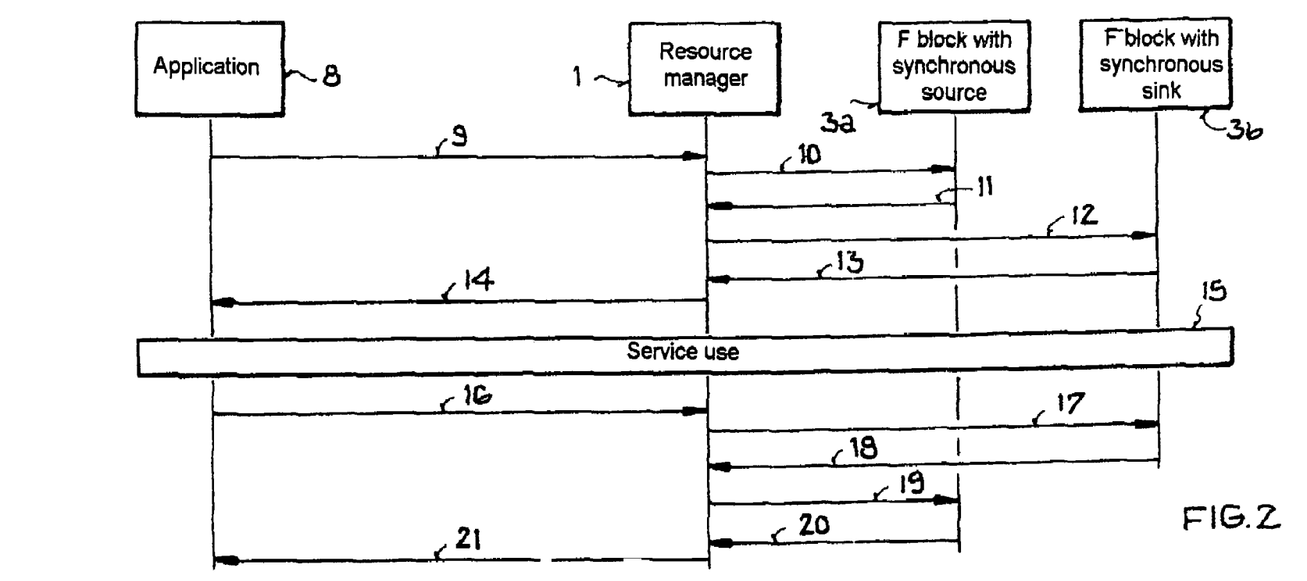
FIG. 2 shows an illustration of the normal operating behavior of the resource manager in accordance with a preferred embodiment.

FIG. 2 shows a preferred method that is carried out during the normal operation of the data bus system. The diagram shows the method sequences during cooperation between the resource manager 1 and an application program (application) 8 which is requesting a synchronous resource via the interface on the resource manager 1. The function block 3a with the synchronous source and the function block 3b with the synchronous sink for the services are controlled by the resource manager 1.

First, the application 8 sends the resource request 9 to the resource manager 1, which may involve concomitant transmission of sender, receiver, priority and list of necessary services or resources, for example. The resource manager 1 checks the necessary services for accessibility, on the basis of its internal data structures for the resources. If necessary, the resource manager 1 assigns a synchronous channel using a communication 10, 11 and connects said channel to the synchronous source 3a. In this case, the resource manager 1 acts as a connection control unit that assigns the appropriate data transmission channel to a service. With synchronous data transmission, the resource manager 1 then assigns the specific service its synchronous channel within a data frame on the data bus.

Following the resource request 9 by an application 8, the resource manager 1 transmits an assignment message 10 to the function block with the synchronous source 3a for the requested service. The function block 3a acknowledges the request and transmits information 11 about the service or the synchronous resource. The resource manager 1 then starts a connection procedure 12 to the function block 3b, which serves as synchronous sink for the service or resource. The function block 3b in turn acknowledges the message 13 and transmits further information, for example a list for synchronous channels or waiting times for particular services. The acknowledgement message 13 triggers a procedure 14 in the resource manager 1, which involves the resource manager 1 acknowledging the request to the application 8 and transmitting an identifier for the service and information regarding whether the request was successful, how long the waiting times are and/or the form in which the service can be used. Following the request process for the service, the application 8 uses the requested resource during the use phase 15.

At the end of use 15, the application 8 sends a message 16 to the resource manager 1, so that the connection to the service or resource can be broken. In this regard, the resource manager 1 again sends the function block 3b a message 17, which the function block 3b acknowledges with a message 18. The resource manager 1 also sends a message 19 to the function block 3a with the synchronous source for the service or resource, whereupon the function block 3a returns an acknowledgement message 20 to the resource manager 1 and acknowledges that the service request or the service use has ended. The resource manager 1 sends an acknowledgement message 21 to the application 8 about cancellation of the service use. Upon a request for a resource, the resource manager 1 allocates a request identifier which is stored in an application or application function, so that future communication relating to this request can be related to the previous communications. In the preferred embodiment, the resource manager 1 ensures that synchronous resources cannot be assigned directly by the application 8 under any circumstances.

Figure 3:
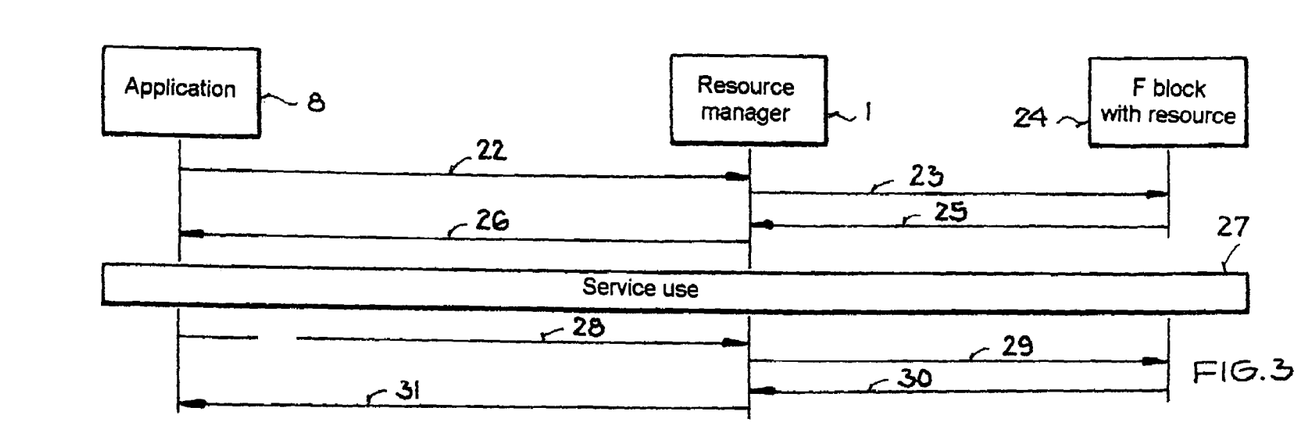
FIG. 3 shows an illustration of the service request and the resource allocation in accordance with a preferred embodiment.

FIG. 3 shows a preferred method for requesting non-synchronous resources via the resource manager 1. The application 8 presents a resource application 22 to the resource manager 1, and the resource manager in turn communicates in a step 23 with a function block which is able to provide the service or resource. The function block 24 acknowledges the request with a message 25 and transfers the necessary data to the resource manager 1. The resource manager 1 uses a message 26 to notify the application 8 about the request state and about any waiting times. Following the permission to access a service and for the resource manager 1 to assign the function block 24 with the service, the application 8 is able to use the service or resource 24 for program execution during the use time 27. When service use has ended, the application 8 notifies the resource manager 1 of this using the request 28, and the resource manager 1 communicates with the function block 24 in a method step 29 in order to notify it that service use has ended. The function block 24 transmits an acknowledgement message 30 to the resource manager 1, and the resource manager 1 acknowledges conclusion of the service use to the application 8 with a message 31.

In a preferred embodiment, the functions of the resource manager 1 itself are also controlled by calling individual functions or services of the resource manager 1. The functions can be provided as software modules and can be called by transferring parameters. By way of example, a function ResourceRequest, a function ResultAcknowledge and a function RequestState can be provided.

Figure 4:
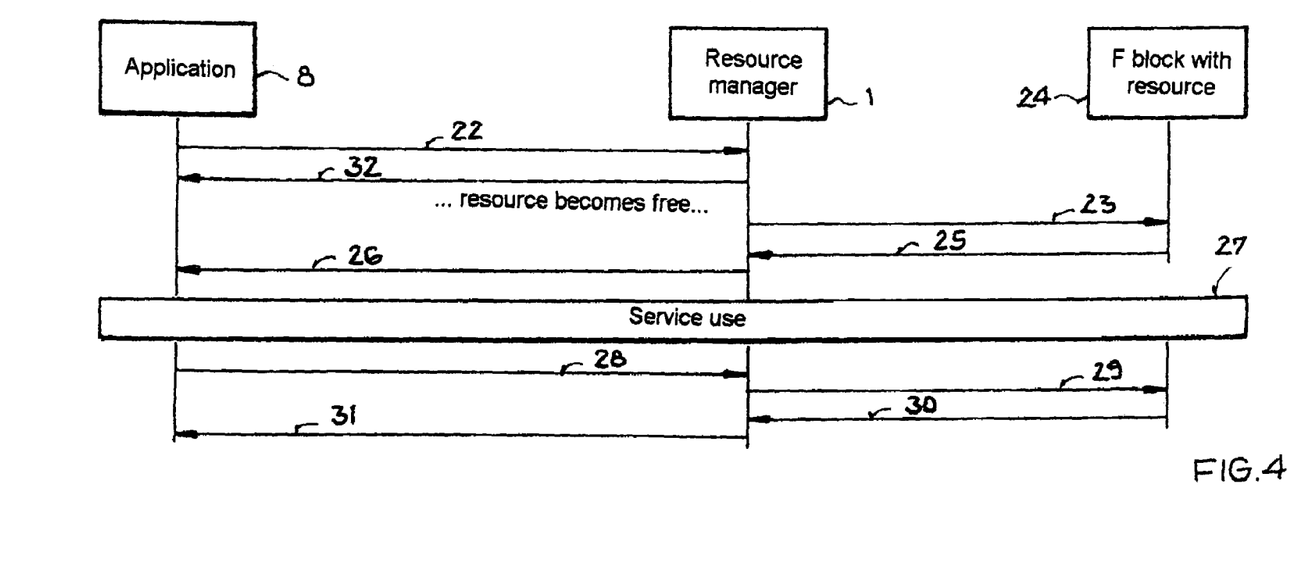
FIG. 4 shows an illustration of the resource request and the request being put into order when the service has been engaged in accordance with a preferred embodiment.

FIG. 4 shows a preferred method in which the resource manager 1 assigns a service of a function block 24 to the application 8, the service being engaged at the time of assignment. Following the resource request 22 and the decision from the resource manager 1 that the resource provided by the function block 24 cannot be called by the application 8 at the time of the request, the resource manager 1 returns a message 32 to the application 8 in order to acknowledge the resource request 22 and to give notification that the request 22 has been put into the queue in order. As soon as the resource becomes free and the resource manager is notified of this on the basis of its data or on the basis of an information item, the resource manager 1 assigns the function block 24 with the resource in the already known step 23 and acknowledges the possible service use to the application 8 in steps 25 and 26. Following the period of use 27 of the service by the application 8, the service of the function block 24 is enabled again by steps 28-31, which have already been described.

Figure 5:
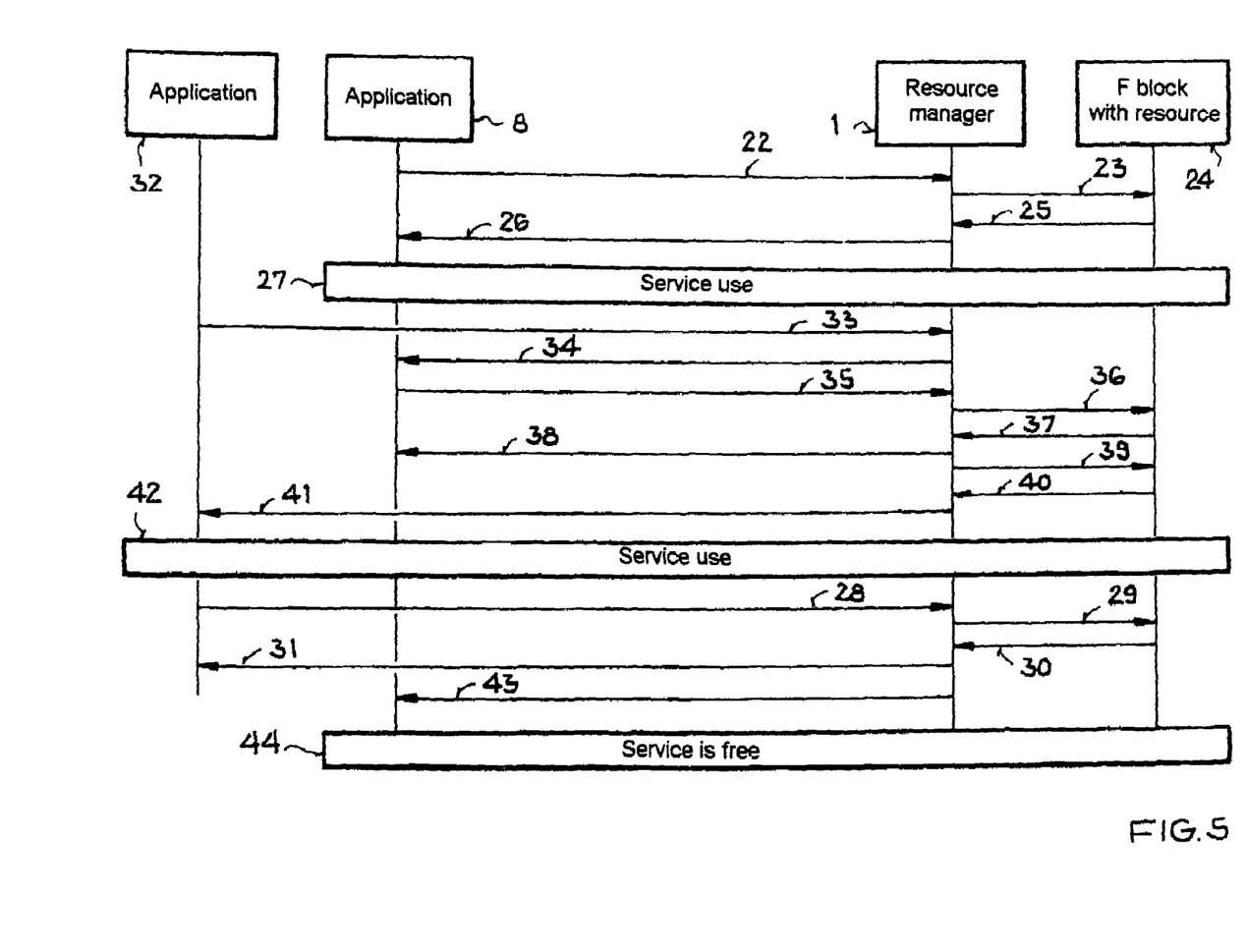
FIG. 5 shows an illustration of two simultaneous resource requests in accordance with a preferred embodiment.

FIG. 5 describes the state when, in addition to the first application 8, a second application 32 attempts access to the same resource of the function block 24. The sequence representation describes the case when a first application 8 with relatively low priority is already using the resource of the function block 24 while a second application 32 with high priority requests use of the resource. To this end, the resource manager 1 receives from the application 32 the request 33 for using the service and then sends the application 8 with the lower priority a message 34 for checking the status. Depending on the status of use of the service and on the control procedures in the resource manager 1, provision can then be made for the application 8 to relinquish use of the resource of the function block 24 immediately, which prompts the resource manager 1 to send the message 36 in order to signal the end of use of the resource to the function block 24. The end of use of the resource of the function block 24 is reported back to the resource manager 1 using the acknowledgement message 37. The resource manager 1 in turn acknowledges the end of use of the service to the application 8 using the message 38. The messages 39 and 40 are a communication between the resource manager 1 and the function block 24 for the purpose of assigning the service to the application 32. Possible use of the service is then reported to the application 32 by the resource manager 1 using the message 41.

Following the end of the period of use 42, the application 32 then uses the method already described to report the end of use of the service back to the function block 24 and to the resource manager 1, and acknowledges it in method steps 28-31. When the high-priority application 32 has been processed, the resource manager 1 then uses the message 43 to report to the application 8 that use of the resource of the function block 24 is possible during a period of use 44.

In connection with the method just described, the resource manager 1 can provide various manners of proceeding for linking the service engagement to different priorities of the application. By way of example, for very high priorities, service engagements are then enabled immediately for this high-priority application 32. If the two applications 8, 32 have lower priority, provision can then be made for a brief time of further use of the service to be possible, but then for the service to be enabled for the other application 32 as quickly as possible. In addition, the resource manager 1 can provide a timer function which, on the one hand, provides a particular time of further use for the application 8 with the lower priority, or the timer can be used for automatically ending use of the service.

Figure 6:
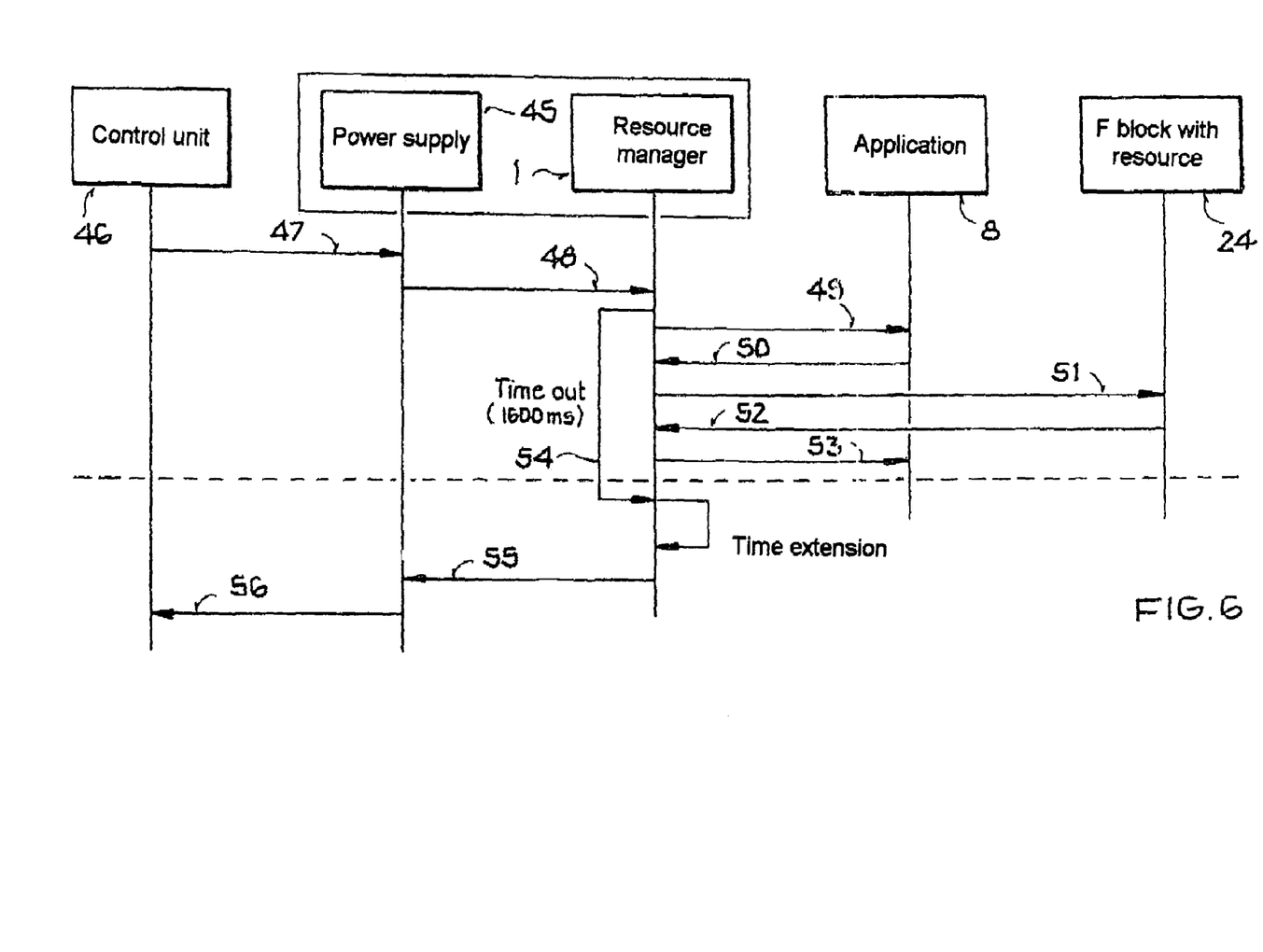
FIG. 6 shows an illustration of the behavior of the resource manager when the system components are shut down in accordance with a preferred embodiment.

FIG. 6 shows a preferred method for when the system is shut down. Each control unit has a power supply device 45 which can be turned on and off by a power supply control unit 46. The power supply control unit 46 forwards a turn-off signal 47 to the power supply device 45 of the resource manager 1 and this power supply device 45 reports to the resource manager 1 through message 48 that it has received a message to shut down the system. The resource manager 1 then starts a turn-off timer and transmits a status check to each application that provides a resource or service. The application 8 uses the message 50 to return the services or resources used and the current status to the resource manager 1. The resource manager 1 transmits a message 51 to the function block 24 with the service used by the application 8, and the function block 24 terminates its service provision and uses the message 52 to report back to the resource manager 1 that the service is no longer available. Finally, the resource manager 1 reports the end of use of the service back to the application 8 with the message 53. This check and these acknowledgement messages are preferably implemented within a time-out time 54 which is measured using the timer monitored by the resource manager 1. When all the resources have been enabled within the turn-off time, the resource manager 1 terminates use of the resource. Finally, the message 55 is transmitted to the power supply device 45, which acknowledges the end of use of the resource.

The power supply device 45 of the resource manager 1 then forwards the message 56 for turning off the system to the power supply control unit 46, which finally turns off the entire power supply via the various power supply devices 45 of the different control units. In particular cases, provision can also be made for the time recording 54 by the resource manager 1 to be extended before turn-off if not all of the resources can be dispensed with by their applications 8 yet. An additional delay time can then also be provided in order to run high-priority services.

The foregoing disclosure has been set forth merely to illustrate the invention and is not intended to be limiting. It should be apparent to those skilled in the art that various modifications, adaptations and alternative embodiments thereof may be made within the scope and spirit of the present invention. The scope of the present invention is defined by the following claims.

What is claimed is:

1. In a data bus system having a resource manager and a plurality of bus users using the data bus, at least one bus user providing services and other bus users using the provided services, wherein the resource manager stores information about a type of the available services provided by the bus users and information about the service-providing bus users, reserves a service from a providing bus user if the providing bus user's service can be used, and sends a response to a requesting bus user so that the requesting bus user can use the service from the providing bus user via the data bus, a method for controlling service engagements for bus users on the data bus system comprising the acts of:
   providing on the data bus via a standard interface associated with the resource manager the information about the provided services;
   making available to the resource manager via the standard interface a change in the provision of a service by a bus user;
   controlling the service engagement with the resource manager on the basis of a priority information item that is associated with a service request of the requesting bus user;
   sending service request messages from a bus user to the resource manager via the data bus; and
   the resource manager using the stored information to ascertain a bus user with the suitable service and asking the bus user whether the service can be used by the requesting bus user.

2. The method according to claim 1, wherein the service request includes the priority information item, and wherein the resource manager uses the priority information item in the event of a collision between two service requests to prescribe which bus user can use the service in which period.

3. The method according to claim 2, wherein the resource manager controls the synchronous and asynchronous data channel engagement and the functions of a data bus.

4. The method according to claim 3, wherein the resource manager controls the assignment of services available in the system to a telematics system and to a data bus over time.

5. The method according claim 4 wherein, to transmit a message via the data bus, a request is transmitted to the resource manager, which calculates the message transmission need for each individual bus user on the data bus for future times, takes the bus protocol as a basis for detecting the time sequence for the data channels, and ascertains the optimum engagement of each data channel on the basis of the calculated communication need.

6. In a data bus system having a resource manager and various bus users using the data bus, at least one bus user providing services and other bus users using the provided services, wherein the resource manager stores information about the type of the available services provided by the bus users and information about the service-providing bus users, reserves a service from a providing bus user if the providing bus user's service can be used, and sends a response to a requesting bus user so that the requesting bus user can use the service from the providing bus user via the data bus, a method for controlling service engagements for the bus users on the data bus system comprising the acts of:
providing the information about the provided services on the data bus by the bus users via a standard interface;
making available to the resource manager via the standard interface a change in the provision of a service by a bus user;
controlling, via the resource manager, services which relate to the functions and the initialization of the bus users and of the data bus system at least partially on the basis of a request priority that is associated with a resource request of the requesting bus user
sending resource request messages from a bus user to the resource manager via the data bus; and
the resource manager using the stored information to ascertain a bus user with the suitable service and asking the bus user whether the service can be used by the requesting bus user.

7. The method according to claim 6, wherein the resource request includes the request priority, and the resource manager uses the request priority in the event of a collision between two service requests to prescribe which bus user can use the service in which period.

8. The method according to claim 7, wherein the resource manager controls the synchronous and asynchronous data channel engagement and the functions of a data bus.

9. The method according to claim 8, wherein the resource manager controls the assignment of services available in the system to a telematics system and to a data bus over time.

10. The method according claim 9, wherein to transmit a message via the data bus, a request is transmitted to the resource manager, which calculates the message transmission need for each individual bus user on the data bus for future times, takes the bus protocol as a basis for detecting the time sequence for the data channels, and ascertains the optimum engagement of each data channel on the basis of the calculated communication need.

11. In a data bus system having a resource manager, at least one bus user adapted to provide services and a plurality of bus users adapted to use the provided services, a method performed by the resource manager for controlling service engagements for bus users comprising the acts of:
storing information about the available services provided by the bus users, the information being received on the data bus via a standard interface;
receiving service requests from bus users via the data bus;
ascertaining a service-providing bus user with the requested service in accordance with the stored information, and if the requested service is available, reserving the requested service from the service-providing bus user;
monitoring, via the standard interface, changes in the provision of a service by a service-providing bus user;
controlling the service engagement on the basis of a priority information item that is associated with the service requests of the bus users; and
using the stored information to ascertain a bus user with the suitable service and asking the bus user whether the service can be used by the requesting bus user.

12. The method according to claim 11, wherein the resource manager controls the synchronous and asynchronous data channel engagement and the functions of a data bus.

13. The method according to claim 12, wherein the resource manager controls the assignment of services available in the system to a telematics system and to a data bus over time.

14. The method according claim 13, wherein to transmit a message via the data bus a request is transmitted to the resource manager, which calculates the message transmission need for each individual bus user on the data bus for future times, takes the bus protocol as a basis for detecting the time sequence for the data channels, and ascertains the optimum engagement of each data channel on the basis of the calculated communication need.

15. In a data bus system having a resource manager, at least one bus user adapted to provide services and a plurality of bus users adapted to use the provided services, a method performed by the resource manager for controlling service engagements for bus users comprising the acts of:
storing information about the available services provided by the bus users, the information being received on the data bus via a standard interface;
receiving service requests from bus users via the data bus;
ascertaining a service-providing bus user with the requested service in accordance with the stored information, and if the requested service is available, reserving the requested service from the service-providing bus user;
monitoring, via the standard interface, changes in the provision of a service by a service-providing bus user;
controlling services which relate to the functions and the initialization of the bus users and of the data bus system at least partially based on priority information corresponding to the service requests of the bus users; and
using the stored information to ascertain a bus user with the suitable service and asking the bus user whether the service can be used by the requesting bus user.

16. The method according to claim 15, wherein each of the service request is assigned a priority, which is used in the event of a collision between two service requests to prescribe which bus user can use the service in which period.

17. The method according to claim 16, wherein the resource manager controls the synchronous and asynchronous data channel engagement and the functions of a data bus.

18. The method according to claim 17, wherein the resource manager controls the assignment of services available in the system to a telematics system and to a data bus over time.

19. The method according claim 18, wherein to transmit a message via the data bus a request is transmitted to the resource manager, which calculates the message transmission need for each individual bus user on the data bus for future times, takes the bus protocol as a basis for detecting the time sequence for the data channels, and ascertains the optimum engagement of each data channel on the basis of the calculated communication need.

20. A data bus system comprising:
a data bus;
a plurality of bus users connected to the data bus, wherein at least one bus user is adapted to provide services and a plurality of other bus users are adapted to use the provided services; and
a resource manager connected to the data bus, the resource manager including a memory and a standard interface and being adapted to maintain in the memory information about service-providing bus users,
wherein the resource manager is further adapted to reserve a service from a service-providing bus user if the providing bus user's service can be used, and send a response to a requesting bus user, so that the requesting bus user can use the service from the providing bus user via the data bus, and wherein the resource manager is further adapted to;
control service engagements for bus users on the data bus system on the basis of priority information that is associated with a service request of the requesting bus user, the resource manager receiving through the standard interface the information about the provided services and monitoring via the standard interface changes in the provision of a service by a bus user; and
to receive the resource request from a bus user via the data bus, and use the stored information to ascertain a bus user with the suitable service and asking the bus user whether the service can be used by the requesting bus user.

21. The data bus system according to claim 20, wherein the resource manager is further adapted to control the synchronous and asynchronous data channel engagement and the functions of a data bus.

22. The data bus system according to claim 21, wherein the resource manager is further adapted to control the assignment of services available in the system to a telematics system and to a data bus over time.

23. The data bus system according claim 22, wherein if a message needs to be transmitted via the data bus a request is transmitted to the resource manager, which calculates the message transmission need for each individual bus user on the data bus for future times, takes the bus protocol as a basis for detecting the time sequence for the data channels, and ascertains the optimum engagement of each data channel on the basis of the calculated communication need.

24. A data bus system comprising:
a data bus;
a plurality of bus users connected to the data bus, wherein at least one bus user is adapted to provide services and a plurality of other bus users are adapted to use the provided services; and
a resource manager connected to the data bus, the resource manager including a memory and a standard interface and being adapted to maintain in the memory information about service-providing bus users,
wherein the resource manager is further adapted to reserve a service from a service-providing bus user if the providing bus user's service can be used, and send a response to a requesting bus user, so that the requesting bus user can use the service from the providing bus user via the data bus,
wherein the resource manager is further adapted to:
control services which relate to the functions and the initialization of the bus users and of the data bus system at least partially on the basis of a request priority that is associated with a resource request of the requesting bus user, the resource manager receiving through the standard interface the information about the provided services and monitoring via the standard interface changes in the provision of a service by a bus user; and
to receive the resource request from a bus user via the data bus, and use the stored information to ascertain a bus user with the suitable service and asking the bus user whether the service can be used by the requesting bus user.

25. The data bus system according to claim 24 wherein the resource request is assigned the request priority, which is used in the event of a collision between two service requests to prescribe which bus user can use the service in which period.

26. The data bus system according to claim 25, wherein the resource manager is further adapted to control the synchronous and asynchronous data channel engagement and the functions of a data bus.

27. The data bus system according to claim 26, wherein the resource manager is further adapted to control the assignment of services available in the system to a telematics system and to a data bus over time.

28. The data bus system according claim 27, wherein if a message needs to be transmitted via the data bus a request is transmitted to the resource manager, which calculates the message transmission need for each individual bus user on the data bus for future times, takes the bus protocol as a basis for detecting the time sequence for the data channels, and ascertains the optimum engagement of each data channel on the basis of the calculated communication need.

* * * * *